(12) United States Patent
Stokes et al.

(10) Patent No.: US 8,857,474 B2
(45) Date of Patent: Oct. 14, 2014

(54) HOSE ASSEMBLY

(75) Inventors: Elizabeth Stokes, Romeo, MI (US); Jeff Makarewicz, Romeo, MI (US)

(73) Assignee: Saint Clair Systems, Washington, MI (US)

( * ) Notice: Subject to any disclaimer, the term of this patent is extended or adjusted under 35 U.S.C. 154(b) by 68 days.

(21) Appl. No.: 13/165,582

(22) Filed: Jun. 21, 2011

(65) Prior Publication Data

US 2011/0308657 A1    Dec. 22, 2011

Related U.S. Application Data

(60) Provisional application No. 61/356,838, filed on Jun. 21, 2010.

(51) Int. Cl.
*F15D 1/02* (2006.01)
*F16L 53/00* (2006.01)

(52) U.S. Cl.
CPC .................................. *F16L 53/002* (2013.01)
USPC ............. 138/38; 138/110; 138/116; 138/149

(58) Field of Classification Search
USPC .................................... 138/38, 110, 116, 149
See application file for complete search history.

(56) References Cited

U.S. PATENT DOCUMENTS

| | | | | |
|---|---|---|---|---|
| 3,151,633 A * | 10/1964 | Shuman | ........................ | 138/177 |
| 3,269,422 A * | 8/1966 | Matthews et al. | ............. | 138/111 |
| 3,565,118 A * | 2/1971 | Thronton | ...................... | 138/112 |
| 3,955,601 A * | 5/1976 | Plummer, III | ................. | 138/149 |
| 4,194,536 A * | 3/1980 | Stine et al. | ..................... | 138/149 |
| 4,279,270 A * | 7/1981 | Francis, Jr. | ..................... | 137/340 |
| 4,399,319 A * | 8/1983 | Zinn | ............................... | 174/47 |
| 4,492,089 A * | 1/1985 | Rohner et al. | ................. | 62/50.7 |
| 4,570,680 A * | 2/1986 | Ratti | ............................. | 138/149 |
| 4,893,670 A | 1/1990 | Joshi et al. | | |
| 5,725,028 A * | 3/1998 | Cleland | ......................... | 138/149 |
| 5,853,031 A * | 12/1998 | de Oliveira | ................... | 138/149 |
| 6,940,054 B1 * | 9/2005 | Heggdal | ........................ | 219/629 |
| 6,983,767 B2 * | 1/2006 | Rickards | ....................... | 138/110 |
| 7,182,126 B2 * | 2/2007 | Heise | ............................ | 165/142 |
| 7,637,288 B2 * | 12/2009 | Kressierer/Huber et al. | . . | 138/149 |
| 7,694,717 B2 * | 4/2010 | Bonner et al. | ................ | 165/80.1 |
| 7,793,689 B2 * | 9/2010 | Becker | .......................... | 138/149 |
| 2002/0045925 A1 * | 4/2002 | Keller et al. | .................. | 607/106 |
| 2004/0144438 A1 * | 7/2004 | Thompson | ...................... | 138/32 |
| 2004/0216795 A1 | 11/2004 | Schippl et al. | | |

FOREIGN PATENT DOCUMENTS

JP          09-306648          11/1997

OTHER PUBLICATIONS

International Search Report and Written Opinion for International Application No. PCT/US2011/041261 mailed on Feb. 22, 2012.

* cited by examiner

*Primary Examiner* — James Hook
(74) *Attorney, Agent, or Firm* — Young Basile Hanlon & MacFarlane P.C.

(57) ABSTRACT

A flexible conduit assembly that includes a central fluid transfer conduit and at least two thermal fluid transfer conduits in overlying relationship to the central fluid transfer conduit at an orientation other than linear relative to the center axis of the central fluid transfer conduit. The flexible conduit assembly may also include an outer jacket concentrically disposed relative to the central fluid transfer conduit with the fluid transfer conduit interposed between the central fluid conveying conduit and the outer jacket.

13 Claims, 2 Drawing Sheets

HOSE ASSEMBLY

The present invention claims priority to U.S. Ser. No. 61/356,838 filed Jun. 21, 2010, the specification of which is incorporated herein in its entirety.

BACKGROUND

The present invention relates in general to hose assemblies. More particularly, the present invention pertains to hose assemblies configured to accurately maintain the temperature of a process fluid as it is conveyed between the exit of a temperature conditioning system and the point of dispense or application.

Fluid viscosity changes as a function of temperature. This is often an issue when fluids are used in manufacturing processes. Variations in viscosity, caused by variations in ambient temperature and/or by factors such as friction, shear, etc. inherent in the process itself, can create issues with the outcome of the manufacturing process. It is therefore often desirable to include some means of controlling the fluid at some pre-defined optimal temperature in order to assure its performance in the associated process. This can be important in a number of manufacturing processes, including but not limited to, delivery or application of materials at a specified temperature.

Modifying the temperature of a fluid is generally performed using a suitable heat exchanger that treats the fluid prior to delivery in the associated process. These heat exchangers are often bulky and rigid and commonly located at some distance from the actual point of use or delivery in the associated manufacturing process itself. The heat treated fluid must then be conveyed to the point of use through pipes or hoses. During this transport from heat exchanger to the point of use, the process fluid is exposed to ambient temperatures. These ambient temperatures may be different than the desired process temperature. The thermal gradient set up between the exterior of the transport pipe or hose and the ambient air will cause an energy transfer between the two. This results in a change in temperature in the process fluid before it reaches the point of use. While insulation can slow this rate of change, it cannot stop it. The change in process fluid temperature is a function of the U-value of the conveying pipe or hose, the temperature differential between the process fluid and the ambient air, and the transfer time between the heat exchanging means and the point of application. It is desirable to provide a process and/or a device that can address, correct and/or prevent/minimize positive or negative thermal deviation as fluid transits that conveying pipe or hose.

In many situations, the thermally regulated material is one that is dispensed within a tightly defined temperature range. In various dispensing applications, the material flow is interrupted between depositions. The material flows during the dispensing operation and then stops while a new part is indexed into position for the next dispensing cycle. This starting and stopping of flow can extend the time that the process fluid is exposed to ambient conditions. In the case of breaks or lunch periods, pauses due to upstream constraints in the process, or breakdowns requiring maintenance, these stoppages of flow can be extended and the resulting changes in temperature of the process fluid can result in a number of dispenses that do not meet the require specification while the path from the heat exchanging means to the point of dispense is purged.

Past developments and configurations have proposed that the conveying piping to be encased in an insulating sleeve configured to contain thermal transfer fluid in order to minimize the thermal gain or loss. In many systems the process fluid must be conveyed via a flexible hose either to accommodate motion in the dispensing process or maintenance of the dispensing system. This is common in both manual and robotic applications. Jacketed fluid conveying piping and hose configurations that have been proposed to date have some drawbacks in certain applications. Thus it would be desirable to provide a construction that eliminates voids and air pockets that exist between the thermal fluid transfer tubes that are present in many jacket configurations. It is also desirable to provide a highly flexible fluid conveying conduit with thermal fluid transferring conduits.

SUMMARY

Disclosed herein is a flexible conduit assembly that includes a central fluid transfer conduit and at least two thermal fluid transfer conduits in overlying relationship to the central fluid transfer conduit at an orientation other than linear relative to the center axis of the central fluid transfer conduit. The flexible conduit assembly may also include an outer jacket concentrically disposed relative to the central fluid transfer conduit with the fluid transfer conduit interposed between the central fluid conveying conduit and the outer jacket.

BRIEF DESCRIPTION OF THE DRAWINGS

To further illustrate and describe the inventions disclosed herein, the present description makes reference to the accompanying drawings wherein like reference numerals refer to like parts throughout the several views, and wherein.

DETAILED DESCRIPTION

Disclosed herein is a flexible conduit assembly that includes a central fluid transfer conduit and at least two thermal fluid transfer conduits in overlying relationship to the central fluid transfer conduit at an orientation other than linear relative to the center axis of the central fluid transfer conduit. The flexible conduit assembly may also include an outer jacket concentrically disposed relative to the central fluid transfer conduit with the fluid transfer conduit interposed between the central fluid conveying conduit and the outer jacket.

In certain embodiments, at least two thermal fluid transfer conduits are configured to be connectable with a suitable thermal fluid conditioning system such that the resulting assembly accurately maintains the temperature of a process fluid as it is conveyed between an apparatus such as a central collection vessel and a point of dispense or application. In various embodiments, the central fluid transfer conduit is completely surrounded by flexible thermal transfer fluid tubes that convey thermal transfer fluid from the temperature conditioning system. The thermal fluid transfer tubes are wrapped around the central fluid conveying conduit in a configuration that provides increased coverage and thermal contact between the respective conduits as well as improving overall flexibility over previous designs. In various embodiments, the resulting configuration may be surrounded with a suitable sleeve member. The sleeve member can be composed of a material with suitable insulation characteristics to facilitate thermal isolation from ambient conditions. Where desired or required, the resulting configuration can be covered with a suitable fabric shell that provides aesthetic and/or protective purposes.

Figure 1:
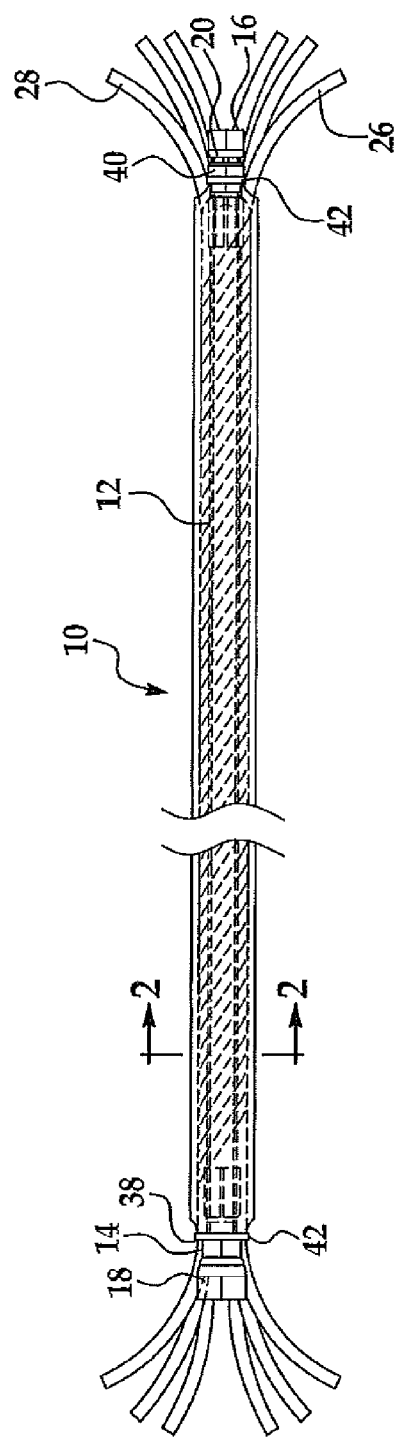
FIG. 1 is a plan view of a hose assembly according to an embodiment as disclosed herein.

In the embodiment depicted in FIG. 1, the hose assembly 10 as disclosed herein includes a central fluid conveying conduit 12 (shown in phantom) configured to convey desired process fluid from a holding tank or other up stream device (not shown) to suitable end point such as a dispensing gun (also not shown). The central fluid conveying conduit 12 has a first end 14 and a second end 16 with a process fluid flow direction such as process flow direction F. The central fluid conveying conduit can be configured with suitable coupling members. The configuration depicted in FIG. 1, includes as male coupling member 18 at the first end 14 and a female coupling member 20 at the second end. 16.

The central fluid containing conduit 12 can be composed of a suitable material that possesses suitable thermal conductivity. In various applications where flexibility of the conduit 12 is desirable, the conduit 12 can be composed of various polymeric materials and blends including but not limited to materials such as Teflon, nylon, polyvinyl chloride, polyacrylates and the like. It is also contemplated that the tube may have more than one or multiple polymeric layers of the same or different polymeric materials depending on the nature of the material to be conveyed. Choice of specific conduit material(s) can be governed by specific application needs. The material of choice can be one which meets or addresses characteristics including, but not limited to, compatibility with the material to be dispensed, pressure resistance and the like. The specific characteristic of the central fluid containing conduit 12 can be governed by considerations including, but not limited to inner diameter, internal pressure rating, chemical compatibility, end connections, etc.

The central fluid containing conduit 12 can be configured with a suitable inner and outer diameter. The inner diameter will be one sufficient to permit appropriate rates of material dispensing. The outer diameter will be one that provides suitable wall thickness for the specific application and facilitates integration with the desired application or fluid transit system. Inner hose selected for inner diameter, internal pressure rating, chemical compatibility, end connections, etc.

In certain embodiments, the central fluid conveying conduit will be composed of a polymeric have a suitable inner diameter. In various embodiments, the inner diameter will be between about ⅛" and about 6". The central fluid conveying conduit 12 as depicted in FIG. 1 has an internal surface 22 and an opposed external surface 24 that is a spaced distance from the internal surface 22 to define a conduit wall thickness between about 1/16" and about 1".

The central fluid conveying conduit 12 can have suitable reinforcement members as desired or required. These reinforcements can include, but are not limited to, integrated fiber reinforcement material in the polymeric matrix, honeycomb webbing, braiding overlying the external surface 24 of the central fluid conveying conduit 12. The reinforcement material can be in continuous overlying relationship or can be provided in one or more localized regions over the length of the conduit 12. It is also within the purview of this disclosure that the reinforcement can extend longitudinally over a portion of the length of the central fluid conveying conduit 12 if desired or required. Overlying relationship can be either direct overlying relationship, i.e. where the reinforcement is in contact with the outwardly oriented surface of the central fluid conveying conduit 12. Overlying relationship can also contemplate the interposition of various intermediate layers.

It is also contemplated that the reinforcement members can be integrated into the structure of the fluid conveying conduit 12.

The flexible hose 10 also includes at least two longitudinal flexible conduits 26, 28 configured to convey at least one suitable thermal conditioning fluid there through. The conduits 26, 28 are positioned in overlying thermal contact with the external surface 24 of the central fluid conveying conduit 12. The conduits 26, 28 are positioned at an orientation relative to the central fluid conveying conduit 12 other than parallel to the longitudinal axis of the flexible fluid conveying conduit 12. In the embodiment depicted the conduits 26, 28 are positioned in a helical or spiral relationship to the central fluid conveying conduit 12. The pitch of the longitudinal flexible conduits 26, 28 relative to the longitudinal axis of the central fluid conveying conduit 12 can be any value that permits and maintains the fluid traversing the central conduit at the desired temperature. In the embodiment depicted in FIG. 1, it is contemplated that the pitch will be between 10 degrees and 80 degrees from vertical in certain embodiments.

In the embodiment depicted in FIG. 1, flexible conduits 26, 28 will have a diameter smaller than the diameter of the central fluid conveying conduit 12. In certain embodiments, it is contemplated that the flexible conduits 26, 28 will have an internal diameter between about 1/16" and about 2" and a wall thickness between about 1/32" and about ½". The flexible conduits can be configured as all return, single (center) return, no return, etc as desired or required.

Figure 4:
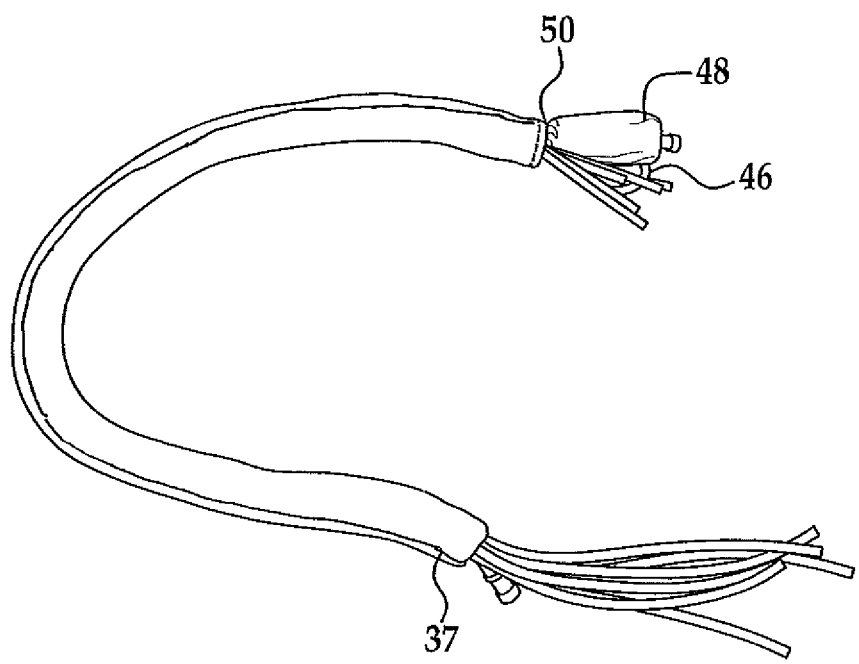
FIG. 4 is a view of an embodiment of the hose assembly as depicted herein.

The flexible conduits 26, 28 can be configured such that one conduit of the conduit pair conveys thermal conditioning fluid in the same general direction as the process fluid flow occurring in the process fluid conveying conduit 12 while the other flexible conduit in the pair conveys fluid in the opposite direction. In the embodiment depicted in FIG. 1, flexible conduits 26, 28 are separate tubes. However, it is also possible that flexible conduits 26 and 28 can be in fluid communication with one another to define a fluid loop. It is also possible that the conduits 26, 28 can be formed as a single loop 46 as depicted in FIG. 4.

Figure 2:
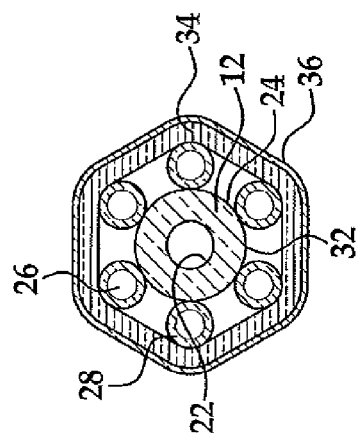
FIG. 2 is a cross section taken along the A-A line in FIG. 1.

The hose assembly 10 can have any number of thermal fluid conveying conduits 26, 28 as desired or required. In certain embodiments, the hose assembly 10 will have an even number of thermal fluid conveying conduits 26, 28 with at least one thermal fluid conveying conduit conveying thermal conditioning fluid back to a suitable thermal fluid conditioning device (not shown) to adjust and regulate the temperature of the conditioning fluid as desired and required. Thermal conditioning can include but need not be limited to elevation or decrease of the temperature of the conditioning fluid and can be triggered by various system inputs. The embodiments depicted in FIGS. 1, 2 and 4 have six thermal conditioning conduits in thermal contact with the external surface 24 of the process fluid conveying conduit 12 with at least one closed loop conduit (depicted in FIG. 4) and at least one return conduit. The return conduit can be one of the thermal fluid carrying conduits 26, 28.

In the embodiments depicted, the flexible thermal conditioning fluid conveying conduits such as conduits 26, 28 are formed into a spiral wrap that conforms to the outside diameter of the central process material conveying conduit 12. The various thermal conditioning fluid conveying conduits 26, 28 are placed in planar parallel relationship to one another such that the plurality of conduits 26, 28 form a band that is wrapped around the process fluid conveying conduit 12 in immediate flat planar relationship to one another. When in position, the outer wall surface of each respective conduit 26, 28 is in contacting relationship with two respective adjacent conduits and with the outer wall surface 24 of the central fluid conveying conduit 12. This configuration and thermal fluid conveying conduit orientation virtually eliminates the air gaps between the tubes as can be seen in FIG. 1.

In the hose assembly 10 disclosed herein, the thermal fluid conveying conduits are in thermal contact with the central process material conveying conduit 12. In various embodiments, at least a portion of the individual thermal fluid conveying conduits 26, 28 are in direct contact with the exterior surface 24 of the central process material conveying conduit 12, thus improving the heat flow between the thermal transfer fluid conveyed in conduits 26, 28 and the process material transiting the inner diameter of the central conduit 12. In various embodiments, all thermal conditioning fluid conduits are in direct contact with the outer surface of the central conduit 12.

In certain embodiments the hose assembly 10 can also include a suitable adhesive layer 32 interposed between the outer surface 24 of the central conduit 12 and the spiral wrapped thermal fluid conduits 26, 28 to maintain the thermal fluid conveying conduits 26, 28 in position relative to the overall assembly 10. Various thermally conductive adhesive materials can be utilized in the adhesive layer 32. The adhesive layer can extend over all or part of the part of the external surface 24 of the central conduit 12.

The spiral configuration of the thermal fluid conveying conduits 26, 28 along the length of the central conduit provides the fluid conveying conduits 26, 28 with the capacity to accomplish rotational movement relative to the central conduit 10 when the hose assembly 10 is flexed or compressed. This configuration results in a hose assembly 10 in which the resistance to bending is reduced and flexibility is increased. This also reduces the wear incurred during hose assembly motion, extending the life of the resulting assembly.

The hose assembly 10 can also include as suitable thermal insulation layer 34 in overlying radial relationship to the spiral wrapped fluid transfer conduits 26, 28. The thermal insulation layer have a suitable thickness and configuration to prevent or minimize thermal transfer to or from the ambient environment external to the hose assembly 10. In various embodiments, the insulation layer can be between 1/16 and 1/2 inch thick. Suitable materials of construction include, but are not limited to high density felt insulations. One non-limiting example of suitable high density felt insulation is available under the trade name NOMEX. The insulation layer 34 as depicted includes one material layer. It is also considered within the purview of this disclosure to employ multiple insulation layers as desired or required. The insulation layer can be connected to the assembly by various suitable mechanisms.

The hose assembly 10 may also include an outer jacket layer 36 in an overlying radial relation to the spiral wrapped fluid conduits 26, 28. In certain embodiments, the outer jacket layer 36 will be configured as a sleeve member configured to maintain at least a portion of the length of the associated hose assembly therein. The outer jacket 36 can be made of any suitable material that is ideally durable and provides protection to the assembly members contained therein. In certain embodiments, the material used in the outer jacket 36 can be an elasticized material of which materials such as SPANDEX are a non-limiting example.

The outer jacket 36 can be formed of a suitable tube of material having a sufficient inner volume to receive and maintain the associated hose assembly 10 such that the spiral wrapped thermal fluid conveying conduits 26, 28 are maintained in thermal contact with and overlying relation to the outer surface 24 of central conduit 12. Where the hose assembly further comprises a thermal insulating layer 34, the insulating layer is interposed between the outer jacket 36 and the spiral wrapped thermal fluid conveying conduits 26, 28. It is also contemplated that, in certain embodiments, the outer jacket 36 can have an insulating layer laminated or integrated therewith. Where desired or required, the outer jacket 36 can be joined by a suitable seam 37 running all or part of the length of the jacket as depicted in FIG. 4.

The outer jacket 36 terminates in a first end 38 proximate to the first end 14 of the central conduit 12 and an opposed second end 40 proximate to the second end 16 of the central conduit 12. The first and/or second ends 38, 40 can be configured with suitable cinching members to maintain the outer jacket 36 in position relative to the central conduit 12 and spiral wrapped thermal fluid conveying conduits 26, 28. This may be configured as an elasticized hem or casing 42.

The thermal fluid conveying conduits 26, 28 can extend outward beyond the respective ends 38, 40 of the outer jacket 36 and associated thermal insulation layer 34, if present. The various thermal fluid conveying conduits 26, 28 can couple to associated thermal fluid conditioning devices (not shown). The thermal fluid conveying conduits 26, 28 can be configured as all return, single (center) return, no return, etc depending on the specific requirements of the associated system.

In specific embodiments, one or more of the coupling members 18, 20 protrude beyond the respective ends of the associated outer jacket 36 (and insulating layer 34 if applicable). A non-limiting exampled of one such configuration is depicted in FIG. 1. An alternate configuration is depicted in FIG. 4. In FIG. 4, the thermal fluid conveying conduits extend beyond the second end 40 of the outer jacket 36 as depicted. The thermal fluid conveying conduits can be connected to suitable devices such as recirculating assemblies, fluid conditioning units as the like as desired and required. One or more of the individual thermal fluid conveying conduits can be connected to one another as by the loop end 46 so that at least a portion of the thermal conditioning fluid transits the length of the hose assembly in a continuous fashion.

The outer jacket 36 can be configured with one or more jacket extensions configured to surround one ore more of the elements positioned in the main body of the hose assembly 10. In the embodiment depicted in FIG. 4, the jacket 36 includes one extension 48 configured to surround the terminal portion of the central process fluid conduit 12 proximate to the second end 40. The extension may be composed of the same material as the outer jacket 36 if desired or required, and can be configured with integral or separate insulating material as desired or required. Suitable materials include those previously described.

In the embodiment depicted in FIG. 4, the extension 48 is a tubular member attached to the second end of the jacket 36 in a manner that defines a pocket proximate opening 50 into which the central process fluid conveying conduit can extend. The jacket extension proximate to opening 50 can have any suitable size to accommodate the diameter of the central conduit 12. The jacket extension proximate to opening 50 can have suitable closures such as cinches and the like to further provide a suitable fitting closure around the conduit 12.

The extension 48 may be of any suitable length to provide individual jacketing of the extension portion of the conduit 12. The jacket 36 can have other extensions as desired or required. One non-limiting example of a suitable extension would be one configured to cover one or more extensions of the thermal fluid carrying conduits, applicator guns etc.

Figure 3A:
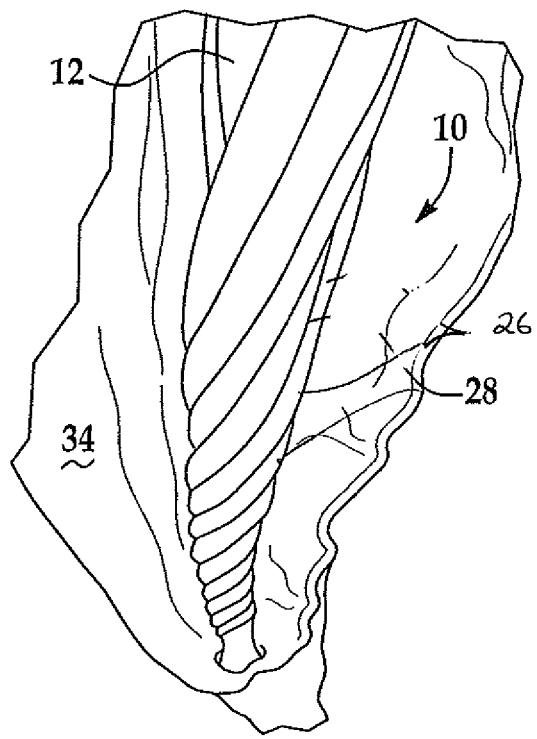
FIGS. 3A and 3B are views of an embodiment of the hose assembly as disclosed herein.
Figure 3B:
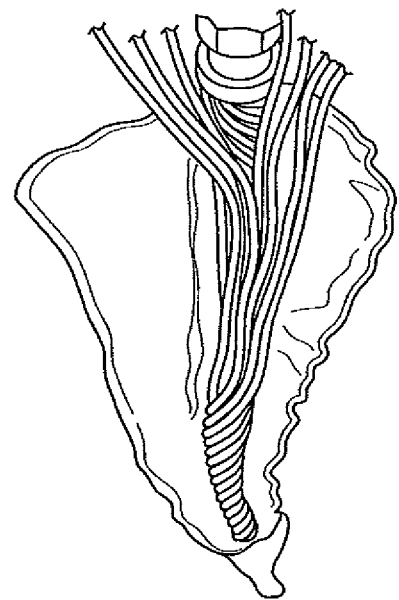

The hose assembly 10 can be produced by the application of a planar thermal fluid conveying conduit array in wrapped spiral relation to a suitable process fluid conveying conduit. This process is generally outlined in FIGS. 3A and 3B. The planar thermal fluid conveying conduit array can be formed by orienting a plurality of individual conduits 26, 28 on a suitable substrate in abutting side by side relationship to one another. To form the array, the conduits can be laid side-by-side on double stick tape in certain embodiments.

The formation of the array can be contemporaneous with the spiral wrapping step over the outer face 24 of the desired process fluid conveying conduit 12. The outer face can optionally be prepared with a suitable adhesive layer to assist positioning of the thermal conduits relative to the process fluid conveying conduit. Alternately, the plurality of thermal fluid conveying conduits can be oriented on a suitable substrate having adhesive qualities and the resulting assembly positioned in spiral wrapped fashion on the outer surface. The substrate can be a suitable single or double faced adhesive film.

The thermal transfer fluid conveying conduits 26, 28 can be oriented such that all thermal transfer fluid travel proceeds in the same direction; either in the same direction as the process fluid or in the opposite direction of process fluid travel. It is also contemplated that the thermal fluid transfer conveying conduits 26, 28 can be configured to facilitate one or more transfer fluid return in a closed-loop fashion. Where one or more of the thermal fluid transfer conduits are configured for fluid return, the individual tubes in the thermal tube array can be positioned to provide desired thermal conditioning for the process fluid conveyed in the central conduit. In various embodiments this orientation can be one that positions a return conduit proximate to a supply conduit.

The outer jacket and the insulating layer can be positioned in sequence after or in tandem sequential process as the spiral wrapping step proceeds.

The hose assembly as disclosed herein can accurately maintain the temperature of a process fluid as it is conveyed between the exit of a temperature conditioning system and the point of dispense or application. The inner fluid material carrying conduit 12 is completely surrounded by flexible conduits 26, 28 that recirculate thermal transfer fluid from the temperature conditioning system. These conduits 26, 28 are wrapped in a spiral pattern which provides increased coverage and thermal contact as well as improved flexibility over previous designs. This configuration is completely surrounded with a suitable insulation layer such as Nomex fabric to thermally isolate it from ambient conditions and is then covered with a Spandex shell both for aesthetic purposes and to prevent damage to and maintain flexibility of the completed assembly.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hose assembly comprising:
   a unitary flexible process fluid conveying conduit having an inner process fluid contacting surface defining a hollow conduit and an opposed outer surface; and
   a thermal fluid transfer tubing assembly spirally wrapped around the opposed outer surface of the unitary process fluid conveying conduit, the thermal fluid transfer tubing assembly in thermal communication with the unitary process fluid conveying conduit, wherein the thermal transfer tubing assembly is composed of a plurality of individual thermal transfer fluid tubes, wherein each individual thermal transfer tube comprises an inner surface and an outer surface and wherein a portion of the outer surface each individual thermal transfer fluid tube is in movable abutting contact with the outer surface of at least one other individual thermal transfer fluid tube adjacent thereto, wherein an additional portion of the outer surface each individual thermal process tube contacts the opposed outer surface of the unitary flexible process fluid convey conduit, and wherein the individual thermal transfer fluid tubes move relative to the unitary flexible process fluid conveying conduit as the unitary flexible process fluid conveying conduit bends; wherein the unitary flexible process fluid conveying conduit is centrally disposed relative to the thermal transfer tubing assembly.

2. The hose assembly of claim 1 wherein at least two of the thermal transfer fluid tubes in the thermal transfer tubing assembly are in fluid communication with each other and are configured to transfer fluid in a first direction in one thermal transfer fluid tube and in an opposed direction in the thermal transfer fluid tube in abutting relationship therewith.

3. The hose assembly of claim 1 wherein the plurality of individual thermal transfer fluid tubes are each in longitudinal abutting relationship with two other thermal transfer fluid tubes when the thermal transfer tubing assembly is in the spiral wrapped position.

4. The hose assembly of claim 1 wherein the thermal transfer fluid assembly is in overlying contact with the outer surface of the unitary process fluid conveying conduit.

5. The hose assembly of claim 1 further comprising a thermally conductive adhesive layer interposed between the outer surface of the unitary process fluid conveying conduit and the thermal transfer fluid tubing assembly.

6. The hose assembly of claim 1 further comprising at least one jacket member concentrically disposed around and external to the spirally wrapped thermal transfer fluid tubing assembly.

7. The hose assembly of claim 6 wherein the jacket member has a first end and a second end and wherein the jacket member comprises a tubular sleeve in overlying relationship to the spirally wrapped thermal transfer fluid tubes and elasticized end members proximate to the respective first and second ends.

8. The hose assembly of claim 7 further comprising at least one insulation member interposed between the jacket member and the spirally wrapped thermal fluid transfer tubing assembly.

9. The hose assembly of claim 1 further comprising means for introducing thermally conditioned fluid into at least one of the thermal transfer fluid conduits in the thermal fluid transfer assembly.

10. A flexible hose assembly comprising:
   a unitary flexible polymeric process fluid conveying conduit having an inner process fluid contacting surface defining a single hollow conduit and an opposed outer surface;
   a thermal fluid transfer tubing assembly spirally wrapped around the opposed outer surface of the unitary process fluid conveying conduit, the thermal fluid transfer tubing assembly exterior to and in thermal communication with the unitary process fluid conveying conduit, wherein the thermal transfer tubing assembly is composed of a plurality of individual thermally conductive polymeric thermal transfer fluid conduits, wherein the plurality of individual thermal transfer fluid conduits are each in longitudinal abutting relationship with two other thermal transfer tubes when the thermal transfer tubing assembly is in the spiral wrapped position, and wherein each of the abutting tubes are moveable relative to the unitary flexible polymeric process fluid conveying conduit as the unitary process fluid conveying conduit is bent;

at least one jacket member concentrically disposed around the spirally wrapped thermal transfer tubing assembly; and at least one insulation layer interposed between the jacket member and the spirally wrapped thermal fluid transfer tubing assembly.

11. The hose assembly of claim 10 wherein at least two of the thermal transfer tubing in the thermal transfer tubing assembly are in fluid communication with each other and are configured to transfer fluid in a first direction in one thermal fluid transfer tubing and in an opposed direction in the tubing in fluid communication therewith.

12. The hose assembly of claim 10 wherein the thermal fluid transfer tubing assembly is in overlying contact with the outer surface of the unitary process fluid conveying conduit.

13. The hose assembly of claim 10 further comprising a thermally conductive adhesive layer interposed between the outer surface of the unitary process fluid conveying conduit and the thermal transfer tubing assembly.

* * * * *